(12) United States Patent
Kulesha (10) Patent No.: US 8,074,919 B1
(45) Date of Patent: Dec. 13, 2011

(54) PARACHUTE SUPPORT AND STABILIZATION FOR HELICOPTER RECOVERY SYSTEMS

(75) Inventor: Richard L. Kulesha, Bear, DE (US)

(73) Assignee: The Boeing Company, Chicago, IL (US)

( * ) Notice: Subject to any disclaimer, the term of this patent is extended or adjusted under 35 U.S.C. 154(b) by 301 days.

(21) Appl. No.: 12/574,800

(22) Filed: Oct. 7, 2009

(51) Int. Cl.
*B64C 25/00* (2006.01)

(52) U.S. Cl. ............. 244/17.15; 244/139; 244/140

(58) Field of Classification Search ............. 244/17.15, 244/139, 140, 138 R, 17.11, 147
See application file for complete search history.

(56) References Cited

U.S. PATENT DOCUMENTS

| | | | |
|---|---|---|---|
| 1,705,489 A * | 3/1929 | Mladinich | 244/17.15 |
| 2,812,147 A | 11/1957 | Trabucco | |
| 3,138,348 A | 6/1964 | Stahmer | |
| 4,709,881 A | 12/1987 | Rafikian et al. | |
| 5,386,781 A | 2/1995 | Day | |
| 5,826,827 A * | 10/1998 | Coyaso et al. | 244/139 |
| 5,836,544 A | 11/1998 | Gentile | |
| 6,199,799 B1 * | 3/2001 | Lai | 244/139 |
| 7,546,976 B2 * | 6/2009 | Li | 244/17.23 |
| 7,559,506 B2 * | 7/2009 | Kissel, Jr. | 244/17.15 |
| 2011/0101157 A1 * | 5/2011 | Kissel, Jr. | 244/17.15 |

OTHER PUBLICATIONS

"The Plane with the Parachute—CAPS—Live With It."—Cirrus Airframe Parachute System website—cirrusaircraft.com/parachute—retrieved on Oct. 6, 2009.

* cited by examiner

*Primary Examiner* — Christopher P Ellis
(74) *Attorney, Agent, or Firm* — Ostrager Chong Flaherty & Broitman P.C.

(57) ABSTRACT

A parachute support system for supporting a helicopter emergency parachute is provided, comprising a parachute support shaft located within a main rotor shaft, said parachute support shaft being rotationally separated from the rest of the helicopter through the use of bearing supports or enclosures. As the parachute support shaft is connected to the main rotor shaft at multiple distinct and distant points, the system described also provides a preferable load path transfer route, such that parachute system malfunction is minimized.

21 Claims, 9 Drawing Sheets

PARACHUTE SUPPORT AND STABILIZATION FOR HELICOPTER RECOVERY SYSTEMS

TECHNICAL FIELD

The present disclosure relates generally to emergency parachute systems for rotational blade aircrafts and, more specifically, to an improved parachute deployment, support and stabilization system for placement within a main rotor shaft of a rotational blade aircraft.

BACKGROUND

Rotational blade aircrafts, such as single and tandem rotor helicopters, rely upon the lift created by the rotation of their rotor blades to remain airborne. Should the aircraft experience a loss of power or other mechanical failure, other systems must be available to safely land the aircraft.

Most rotational blade aircrafts today are capable of autorotation even during a power outage. Autorotation is the ability of the rotors of a rotational blade aircraft to continue to rotate even without power and to provide sufficient lift to land the aircraft at a safe speed. However, autorotation may not be available in all emergency situations, for example, when the main rotor blade has been damaged.

It has therefore been found advantageous to incorporate emergency parachute systems into rotational blade aircrafts, which deploy a parachute when an emergency situation exists or in other situations where use of a parachute is appropriate. Such parachutes are designed to increase drag when deployed, thus reducing vertical air speed and increasing the chances for a safe landing. Such parachute systems may be used alone or together with autorotation to improve control of the aircraft's vertical air speed.

For example, U.S. Pat. No. 5,836,544 to Gentile discloses a parachute system with forward and aft parachutes connected to structures found on the bottom side of a rotor-type aircraft. The disclosed system adds substantial weight and drag to the aircraft during normal flight operations, and suffers from a high likelihood that parachute lines will be entangled with the main rotor, and of increased moment (torque or bending) loads at the forward and aft portions of the aircraft, which could bend or otherwise damage the aircraft or foul the parachutes.

U.S. Pat. Nos. 2,812,147 to Trabucco and 3,138,348 to Stahmer both disclose parachute support systems wherein a parachute is stored inside a domed housing fixed above the helicopter rotor during normal flight operations. The dome housings are affixed to the top of the helicopters' rotor shafts, thus all loads from the parachute are focused on the tip of the rotor shafts, which may cause mechanical failure due to high moment loads at that point. These systems also require a large number of parts, leading to high weight and complexity, and have high profiles that may cause high drag during normal flight operations.

U.S. Pat. No. 4,709,881 to Rafikian et al. discloses a parachute system for disabled helicopters comprising a parachute housing disposed above and attached to the helicopter's main rotor shaft. Within the parachute housing can be found a platform having rungs for attachment to a parachute. The platform is rotationally separated from the rest of the aircraft through the use of ball bearings. However, the loads from the parachute will be concentrated only at the top of the rotor. This system will therefore be subjected to high moment loads at the tip of main rotor shaft, and the high profile may cause unwanted drag during normal flight operations.

U.S. Pat. No. 6,199,799 to Lai discloses a parachute system for a helicopter wherein a parachute is connected directly to the bottom of a main rotor shaft, which introduces high concentrated loads on the mast. Due to this concentration of load, this system can only be used on small or light helicopters.

Thus, current parachute systems suffer from one or more of the following problems: insufficient or improper rotational separation of the parachute from the rest of the aircraft, high parachute system weight, part count, profile, and complexity, or improper parachute system load pathing, leading to dangerous mechanical stresses. Once a parachute is deployed, most if not all of the entire weight of the aircraft is borne by the parachute. If the load is not transferred between the helicopter body and the parachute in a proper way, mechanical failure or malfunction may occur. A parachute system which is attached only to a single point and offset of the centerline of the aircraft may suffer from high moment loads and moment loads that cause parachute rotation. Parachute rotation may also be caused when there is insufficient rotational separation between the parachute and the aircraft, which could lead to tangling of the parachute's support cables or other mechanical malfunction of the parachute system.

Thus, there is a need for a parachute system for a rotational blade aircraft which distributes the load of the aircraft properly, is rotationally separated from the aircraft, does not create high moment loads on the main rotor shaft or other aircraft parts, has low complexity, low weight, low profile, and does not risk interference between the parachute and other parts of the aircraft.

SUMMARY

The present disclosure provides an apparatus and method for supporting a parachute in a rotational blade aircraft, which directs the load path from the parachute through the rotor shaft in a beneficial manner by providing bearing supports located at a top and bottom end of a parachute support shaft and rotor shaft, while providing for rotational separation between the aircraft and the parachute. The present disclosure also provides a parachute support apparatus having minimal parts, weight and aerodynamic profile compared to the prior art.

A parachute support system is provided, comprising a rotor shaft having a hollow interior, a top bearing engagement flange and a bottom bearing engagement flange, a parachute support shaft having a top portion and a bottom portion, said parachute support shaft being disposed within the hollow interior of the rotor shaft, an upper bearing support having bearings, said upper bearing support being operationally engaged with the top portion of the parachute support shaft and with the top bearing engagement flange of the rotor shaft, and a lower bearing support having bearings, said lower bearing support being operationally engaged with the bottom portion of the parachute support shaft and with the bottom bearing engagement flange of the rotor shaft, said upper and lower bearing supports serving to distribute load from a parachute over the length of the rotor shaft.

A helicopter is also provided, comprising: a helicopter body; a rotor shaft coupled to the helicopter body, said rotor shaft having a hollow interior, a top bearing engagement flange and a bottom bearing engagement flange; a parachute support shaft having a top end and a bottom end, said parachute support shaft being disposed within the hollow interior of the main helicopter rotor shaft; an upper bearing support having bearings, said upper bearing support being operationally engaged with the top portion of the parachute support shaft and with the top bearing engagement flange of the rotor shaft; and a lower bearing support having bearings, said lower bearing support being operationally engaged with the bottom portion of the parachute support shaft and with the bottom support flange of the rotor shaft; said upper and lower bearing supports serving to distribute load from a parachute over the length of the rotor shaft.

A method of fitting a helicopter, having at least one rotor shaft, with a parachute support and stabilization system is also provided, comprising: providing a parachute support shaft having a top portion and a bottom portion; inserting the parachute support shaft into a hollow interior of the rotor shaft; operationally engaging a lower bearing support having bearings to the bottom portion of the parachute support shaft and to a bottom support flange of the rotor shaft; operationally engaging an upper bearing support having bearings to the top portion of the parachute support shaft and to the top support flange of the rotor shaft; said upper and lower bearing supports serving to distribute load from a parachute over the length of the rotor shaft.

A more complete understanding of the parachute support and stabilization system embodiments disclosed herein will be afforded to those skilled in the art, as well as a realization of additional advantages thereof, by a consideration of the following detailed description of one or more exemplary embodiments, particularly if considered in conjunction with the appended drawings, wherein like reference numerals are used to identify like elements illustrated in one or more of the figures thereof.

DETAILED DESCRIPTION OF THE DRAWINGS

In the following detailed description, certain preferred embodiments are described as illustrations in a specific application environment in order to provide a thorough understanding of the present disclosure. Those methods, procedures, components, or functions which are commonly known to persons of ordinary skill in the field of the disclosure are not described in detail so as not to unnecessarily obscure a concise description of the present disclosure. Certain specific embodiments or examples are given for purposes of illustration only, and it will be recognized by one skilled in the art that the teachings of this disclosure may be practiced in other analogous applications or environments and/or with other analogous or equivalent variations of the illustrative embodiments.

Figure 1:
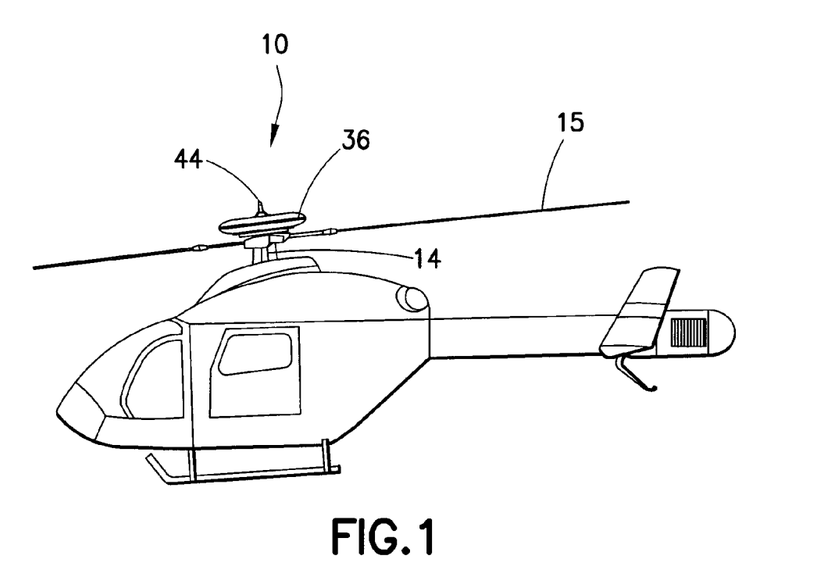
FIG. 1 is a side view of a single rotor helicopter with a parachute support and stabilization system in a non-deployed state.
Figure 2:
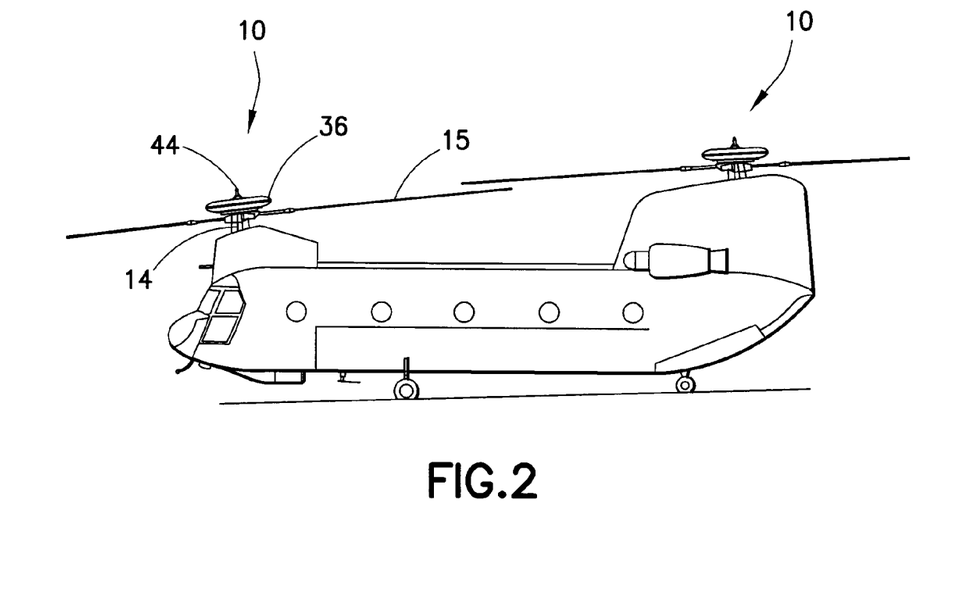
FIG. 2 is a side view of a tandem rotor helicopter with a parachute support and stabilization system in a non-deployed state.
Figure 3:
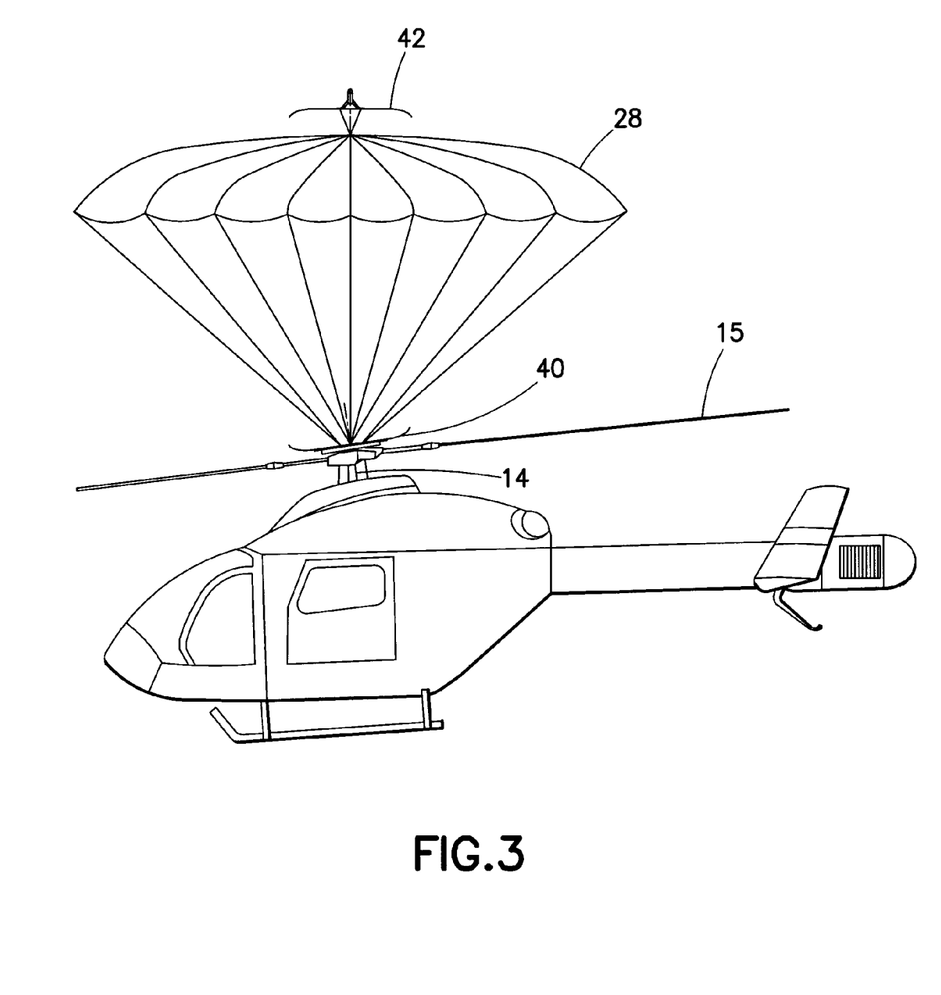
FIG. 3 is a side view of a deployed parachute support and stabilization system incorporated into a single rotor helicopter.

FIGS. 1 and 2 show a parachute support and stabilization system 10 employed on a single rotor helicopter and a tandem rotor helicopter, respectively. The system 10 is shown in a non-deployed state as it would be during normal flight operations. FIG. 3 shows the parachute support and stabilization system 10 in a deployed state. The system generally comprises a clam-shell shaped parachute housing 36 disposed above the rotor shaft and rotor blade, in which a parachute 28 is disposed, and a parachute support shaft 12 (shown in FIGS. 4 and 5) disposed within the rotor shaft 14 and attached to the parachute 28. When deployed, the parachute 28 assists in slowing the helicopter's descent and providing for a safe landing.

Figure 4:
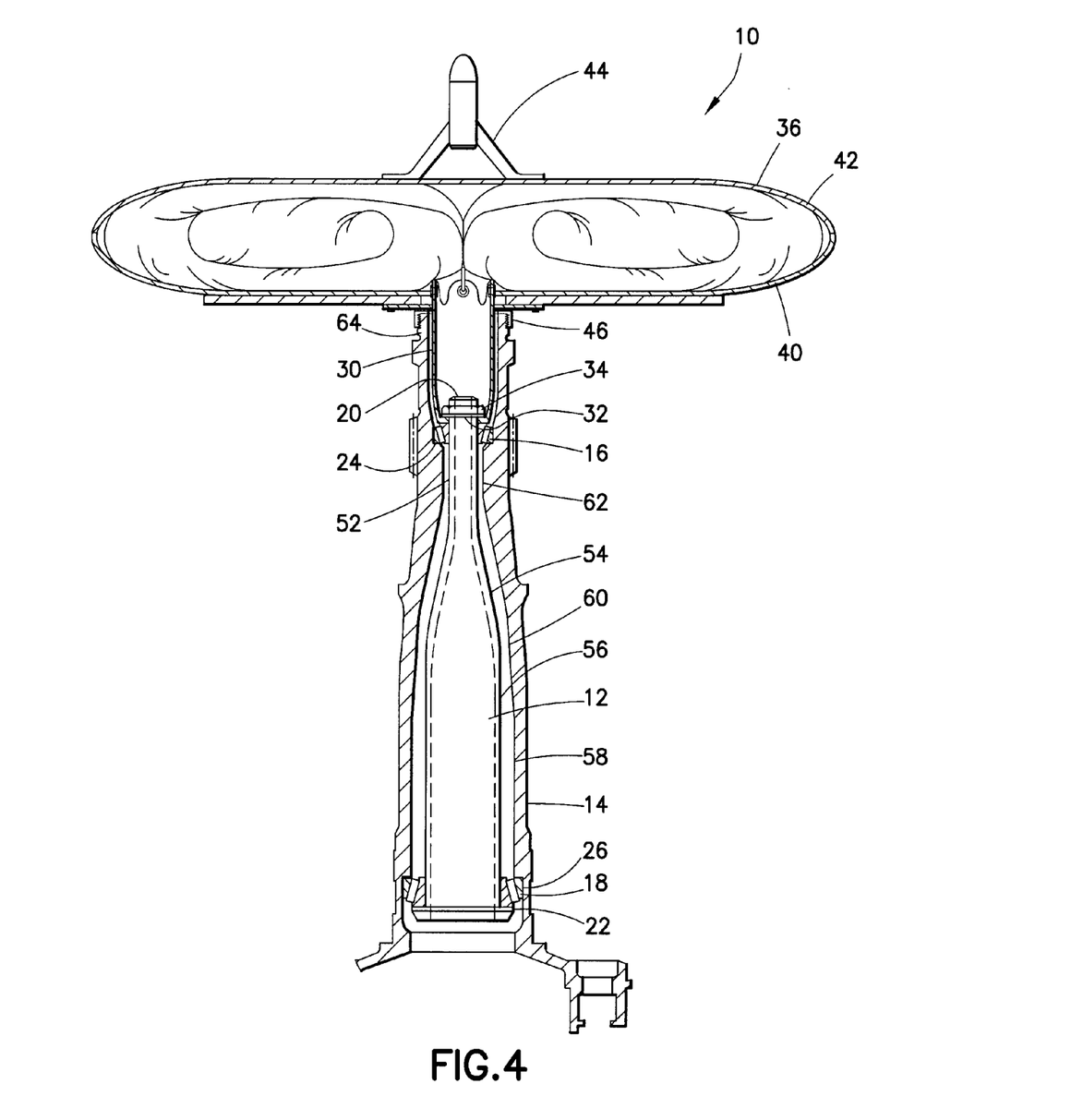
FIG. 4 is a cross-sectional view of a rotor shaft incorporating a non-deployed parachute support and stabilization system.
Figure 5:
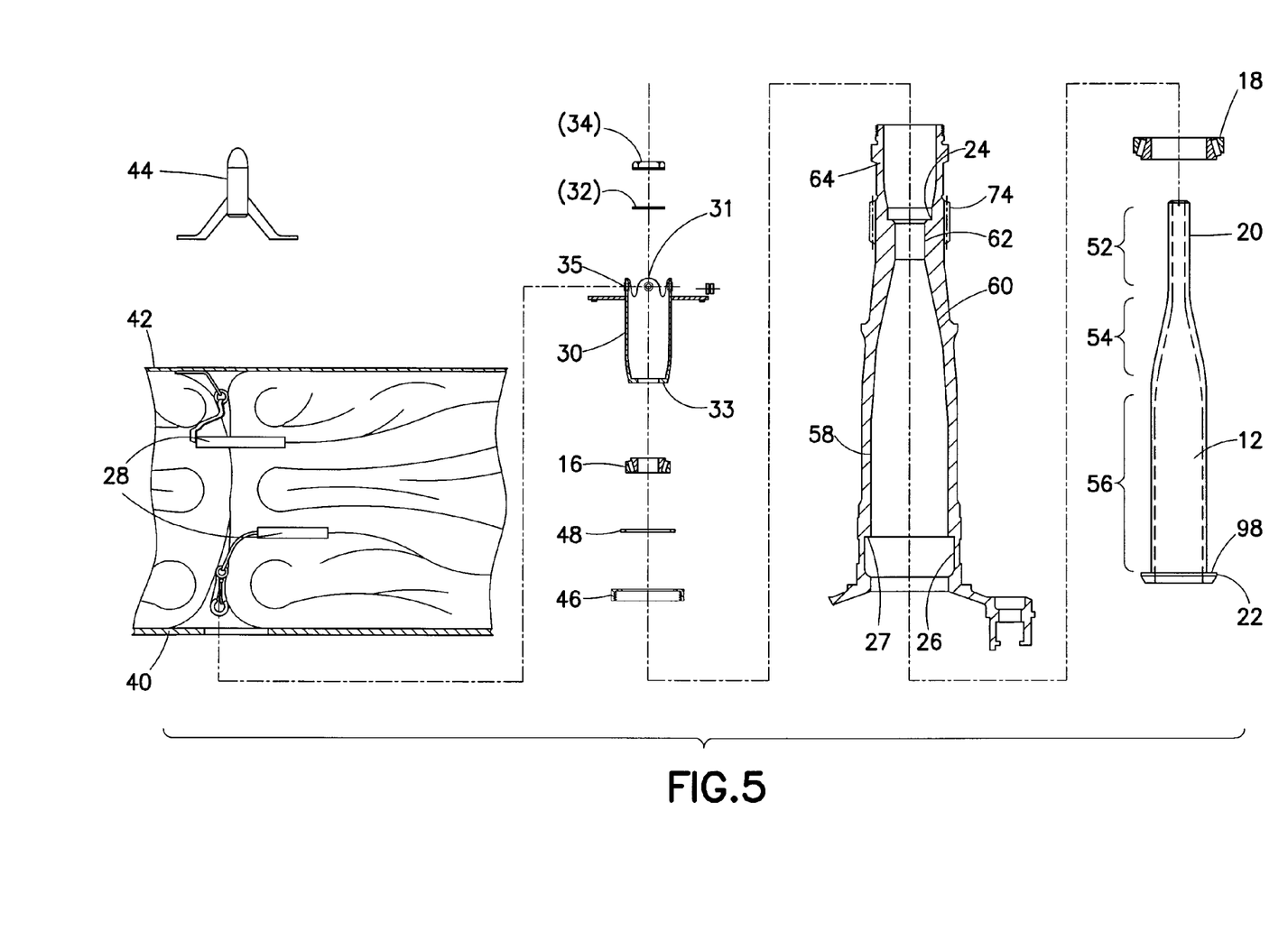
FIG. 5 is an exploded cross-sectional view of the rotor shaft shown in FIG. 4.

As shown in FIGS. 4 and 5, the parachute support shaft 12 is engaged with but rotationally separated from the rotor shaft 14 by a pair of bearing supports 16 and 18 disposed at opposite ends of the rotor shaft 14, as described in more detail below. This rotational separation rotationally isolates the parachute support system 10 from the induced rotation effects of the rotor shaft and blade that are present in a rotational blade aircraft during normal and emergency aircraft operating conditions. Without rotational isolation, the induced rotation effects could lead to twisting, tangling or other fouling of the parachute support cables 29, which could lead to collapse of the parachute 28. This would cause loss of parachute support for the aircraft. The placement of the bearing supports 16 and 18 at the top and bottom ends of the rotor shaft 14 distributes the parachute load throughout the length of the rotor shaft. This load distribution helps prevent the effect of high moment loads, which could lead to mechanical failure of the parachute system 10, and which are caused by movement of the aircraft while it is being supported by the parachute 28.

The parts of the parachute support and stabilization system 10 will now be described in more detail. For purposes of illustration, the parachute support and stabilization system 10 has been described in the context of a single rotor helicopter. However, this should not be construed to limit use of the parachute support and stabilization system 10 to a single rotor aircraft. The system 10 may also be used in tandem rotor helicopters, as shown in FIG. 2, in aircraft having either rotating or non-rotating rotor shafts, and with other types of hovering or rotor aircraft.

Referring now to FIGS. 1, 2, 4, 5 and 6, a clam-shell shaped parachute housing 36 is shown, having a low vertical profile and positioned on top of the helicopter's rotor shaft 14 and rotor blades 15, such that the housing does not provide any significant drag on the helicopter during normal flight operations. The housing 36 stores the parachute 28 during normal flight operations. The housing 36 has a base 40 that is affixed to the parachute support shaft 12, and a removable cover 42. A rocket extraction motor 44 is affixed to the removable cover 42 and is used to separate the cover 42 from the base 40 and deploy the parachute 28.

Figure 6:
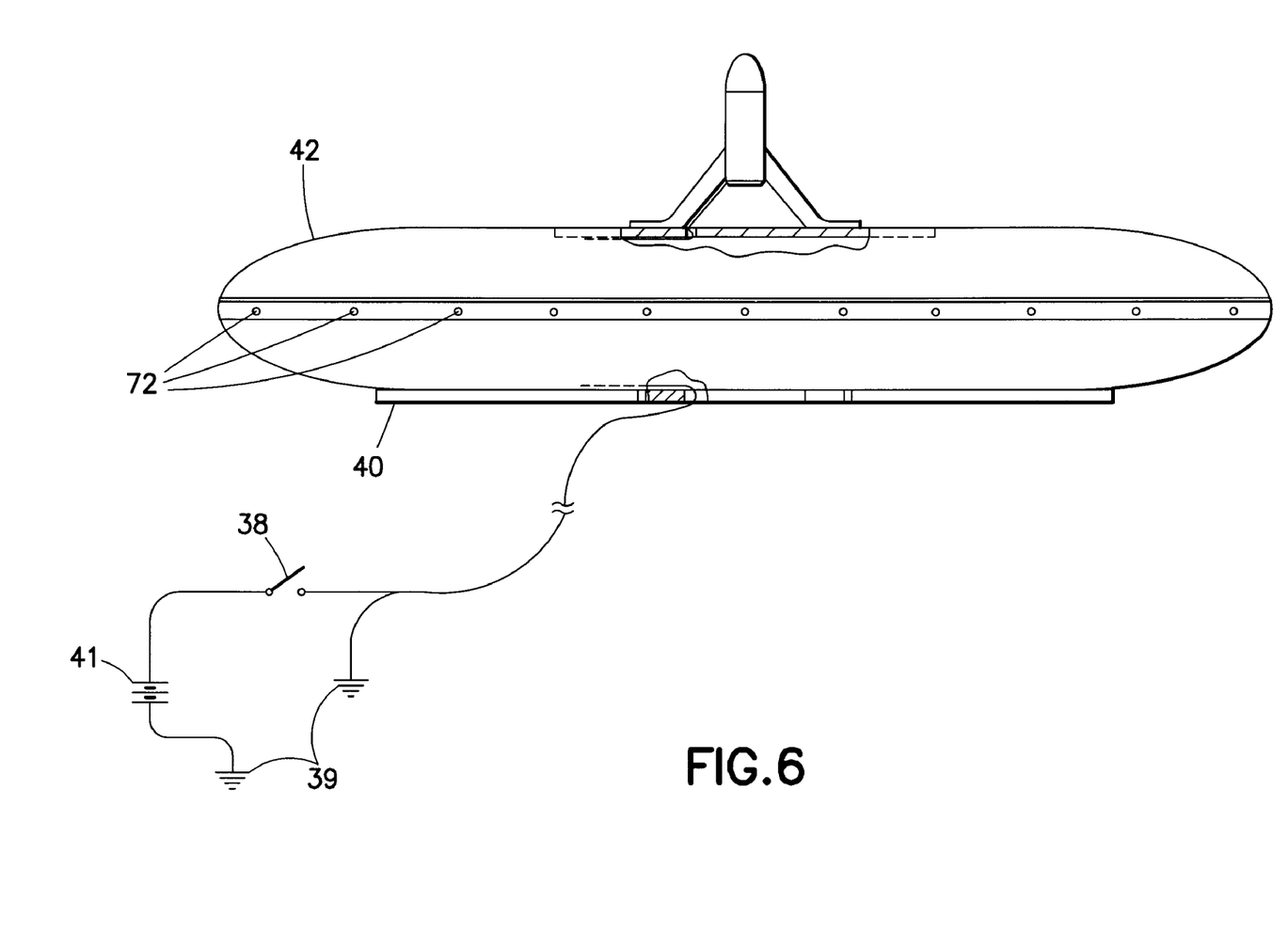
FIG. 6 is a side view of a parachute housing for use with the parachute support and stabilization system of FIG. 4 and a circuit for opening the parachute housing.

To assist in separating the removable cover 42 from the base 40, an explosive charge 72 is placed along the joint between the base 40 and cover 42 of the parachute housing 36. Upon activation of a trigger, the explosive charge is set off and separates the base 40 from the cover 42. The rocket motor 44 is triggered simultaneously with the explosive charge 72 and draws the cover 42 and parachute 28 upwards and away from the helicopter, until the parachute is deployed. During the firing of the rocket extraction motor 44, the cover 42 of the parachute housing 36 shields the parachute 28 from the extraction rocket 44 exhaust.

The parachute 28 is deployed upon activation of a switch 38 by the pilot or co-pilot. Alternatively, triggering of parachute deployment may be done by an automatic system. As shown in FIG. 6, to electrically connect the switch 38 to the rocket motor 44 and explosive charge 72, a circuit exists between the parachute housing 36 and the cockpit. The electrical signal travels from the cockpit switch 38 through a wire which is attached to a slip ring 74 at the rotor shaft 14, which allows the circuit to be completed through the rotating shaft. A power source is attached to ground 39 and to the switch 38. A wire extends from the slip ring 74 to the explosives section and rocket motor at the parachute housing.

Referring now to FIGS. 4 and 5, the engagement of the rotor shaft 14 with the parachute support shaft 12, which is connected to and supports the parachute 28 when the parachute 28 is in a deployed position (as depicted in FIG. 3), will be described in more detail. The parachute support shaft 12 has a top end 20 and a bottom end 22, a top portion 52, a middle portion 54, and a bottom portion 56, wherein the diameter of the top portion 52 is narrower than the diameter of the bottom portion 56 and the diameter of the middle portion 54 gradually increases from the top portion 52 to the bottom portion 56. At the bottom end is a bearing engagement flange 98.

To accommodate the parachute support shaft 12, the interior of the rotor shaft 14 has a geometry that roughly corresponds to that of the parachute support shaft 12. Specifically, the interior of the rotor shaft 14 has (from bottom to top of the rotor shaft) a bottom portion 58, a middle portion 60, a narrow neck portion 62, and a top portion 64. The diameter of the bottom portion 58 is wider than the diameter of the neck portion 62. The diameter of the middle portion 60 preferably gradually decreases from the bottom portion 58 to the neck portion 62. The diameter of the top portion 64 is preferably larger than that of the neck portion 62 but smaller than the diameter of the bottom portion.

The rotor shaft 14 has upper and lower bearing engagement flanges 24, 26, that engage bearing supports 16, 18, which are described in more detail below. The bearing engagement flanges may be anything which serves the purpose of supporting the bearing supports 16, 18 and transferring load from the parachute support shaft to the rotor shaft. The upper bearing engagement flange 24 is shown as an annular rim or ledge located directly above the neck portion 62 of the rotor shaft 14, but any appropriate method of attachment may be used, such as welding or fasteners, or any other appropriate method.

At the top end of the parachute support shaft 12 and rotor shaft 14, a top bearing support 16 is sandwiched between the upper bearing engagement flange 24 of the main rotor shaft 14 and a parachute support fitting 30 (which is described in more detail below). At the bottom end 22 of the parachute support shaft 12 the lower bearing support 18 is sandwiched between the bearing engagement flange 98 of the parachute support shaft 12, and the lower bearing engagement flange 27 of the interior of the rotor shaft 14. As the bearing supports 16, 18 are the only points of contact between the rotor shaft 14 and the parachute support shaft 12, and as the bearing supports 16, 18 permit rotation between the parachute support shaft 12 and rotor shaft 14, this configuration ensures rotational separation between the parachute support shaft 12 and rotor shaft 14 while ensuring parachute load distribution throughout the rotor shaft 14.

Figure 8:
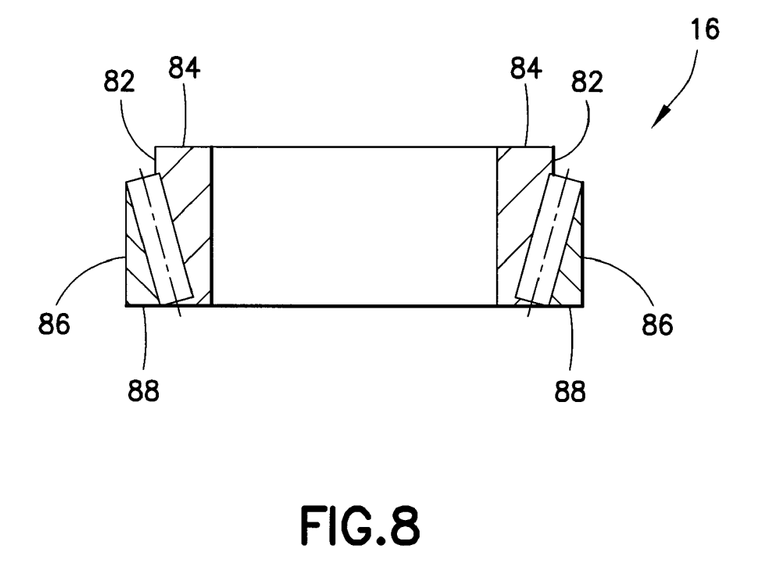
FIG. 8 is a side cross-sectional view of an upper bearing support.
Figure 9:
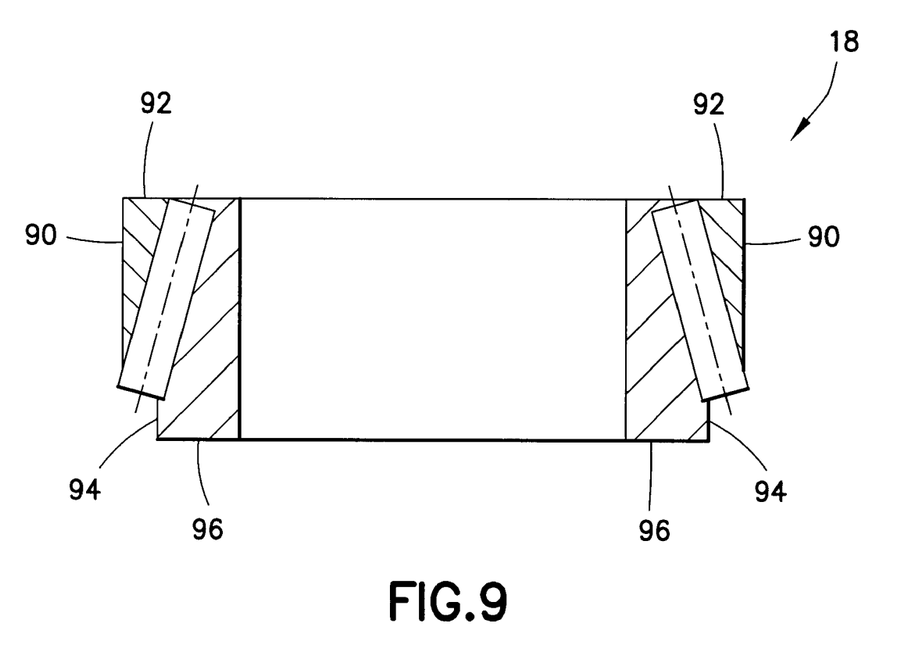
FIG. 9 is a side cross-sectional view of a lower bearing support.

Referring to FIGS. 8 and 9, the structure of upper and lower bearing supports 16, 18 will now be described in more detail. Each bearing support 16, 18 generally comprises outer and inner rotational members which rotate with respect to each other, the rotation being facilitated by bearings between the rotational members. Each rotational member has an engagement surface for interacting with other parts of the parachute support and stabilization system 10. For example, as shown in FIG. 8, the upper bearing support 16 has an inner rotational member 82 possessing an upper engagement surface 84 facing towards the top of the parachute support shaft 12, such that it can engage a parachute support fitting 30. The upper bearing support 16 has an outer rotational member 86 possessing a lower engagement surface 88 facing towards the bottom of the parachute support shaft 12, such that it can engage an upper bearing engagement flange 24. As shown in FIG. 9, the lower bearing support 18 preferably has an outer rotational member 90 having an upper engagement surface 92 facing towards the top of the parachute support shaft 12, to engage a lower bearing engagement flange 26, and has an inner rotational member 94 possessing a lower engagement surface 96 facing towards the bottom of the parachute support shaft 12, to engage the bearing engagement flange 98 of the parachute support shaft 12. The interface between the two rotational members is at an angle with respect to the engagement surfaces, and bearings 99 are preferably located at that interface, such that the two rotational members may rotate with respect to each other.

The bearing supports 16, 18 may contain a variety of different kinds of bearings, including ball bearings, roller bearings, flat bearings, or other kinds of bearings known in the art, and the bearing supports are sealed. It is beneficial to reduce the drag of the bearings within the bearing supports 16, 18. While lubricated bearings may be used within the bearing supports 16, 18, sealed bearings should be sufficient, due to the minimal rotation of the parachute support shaft 12 and minimal preloading of the bearing supports at installation (i.e. there is little to no load on the bearing supports while the parachute is not deployed).

The connection between the parachute 28 and the parachute support shaft 12 is shown in the exploded view of the parachute support system 10 of FIG. 5 and will now be described in more detail. A parachute support fitting 30 is partially inserted into the top portion 64 of the rotor shaft 14 and attached to the parachute support shaft 12. The parachute support fitting 30 is shaped as a cup or funnel, and has a bottom end 33 and a top end 31. The bottom end 33 is inserted into the helicopter rotor shaft 14 while the top end 31 remains outside of the rotor shaft 14. The top end 31 has one or more loops 35 for attachment to the parachute 28 by one or more parachute cables 29. Parachute cables 29 attach the parachute 28 to the support fitting 30 and also attach the parachute 28 to the cover 42 of the parachute housing 36. At its bottom end, the parachute support fitting 30 has a hole 37 through which the parachute support shaft 12 fits. The attachment between the parachute support fitting 30 and the parachute support shaft 12 is made by a washer 32 and support fitting nut 34 which are both fitted over a threaded section 45 of the parachute support shaft 12, thereby fastening the parachute support shaft 12 to the parachute support fitting 30.

A cap 46 is fastened over the rotor shaft 14, with the parachute support fitting 30 exposed through it. The cap 46 has a seal and seal retainer disposed between the parachute support fitting 30 and a hole in the cap 46. The cap 46 is threaded on the interior, so that it may be fastened over the aircraft rotor shaft 14, whose exterior surface is threaded at the top. The purpose of the cap and seal is to help reduce corrosion and other environmental effects on the components by minimizing moisture, dirt, dust and debris from migrating into and in-between the rotor shaft and the parachute support shaft 12 and from migrating into the sealed bearings.

Figure 7A:
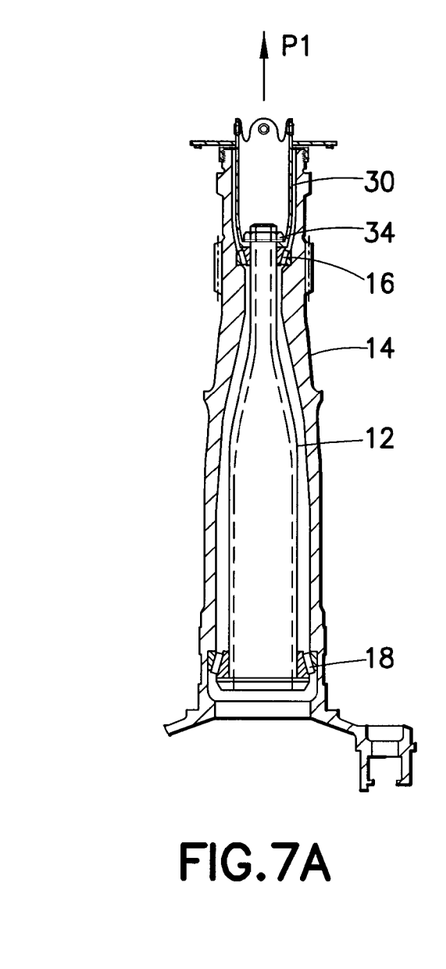
FIG. 7A is a cross-sectional view of the rotor shaft shown in FIG. 4 depicting the load produced by a deployed parachute.
Figure 7B:
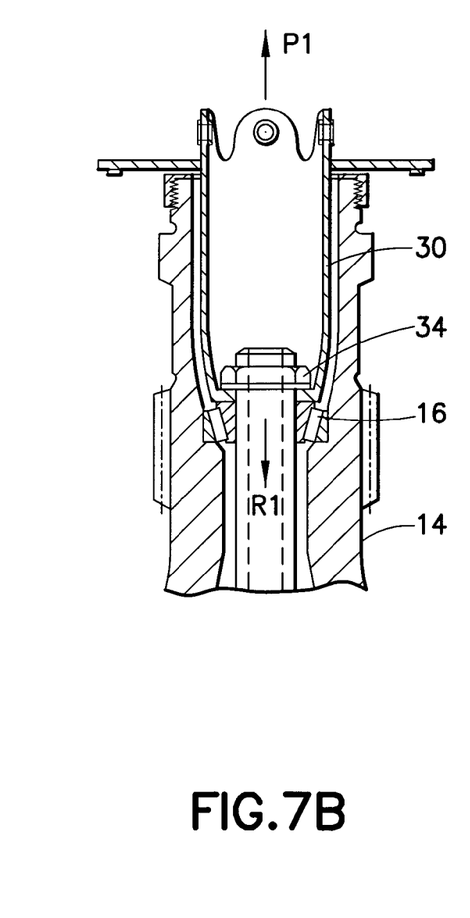
FIGS. 7B and 7C are, respectively, magnified cross-sectional views of a top portion and a bottom portion of the rotor shaft shown in FIG. 4 depicting the load produced by a deployed parachute.
Figure 7C:
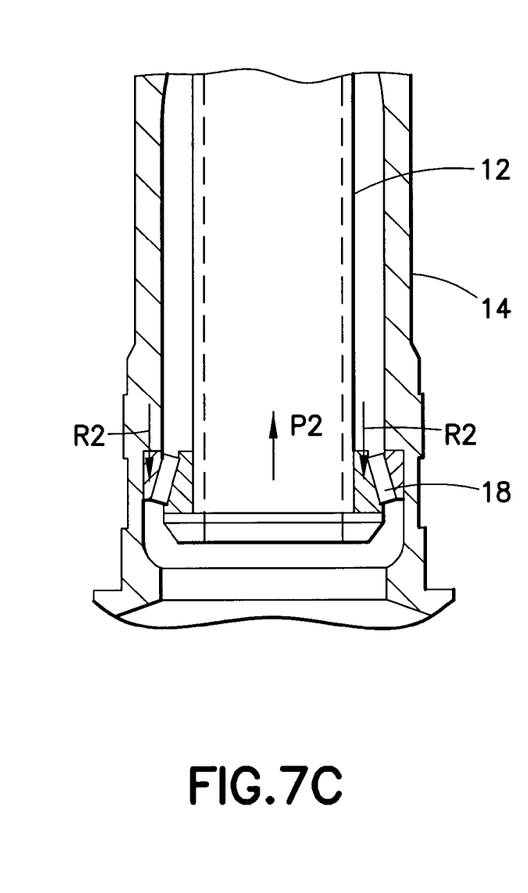

Referring now to FIGS. 7A-7C, the distribution of load from the parachute and over the length of the parachute support shaft and rotor shaft is shown and described. Upon deployment of the parachute 28, the entire weight load of the aircraft will be borne by the parachute 28. The bearing supports 16, 18 will be subjected to impact forces, which will be transferred to the rotor shaft 14, which is already designed to accommodate these loads.

Load from the parachute creates an upward load (P1 in FIG. 7A) on the parachute support fitting 30. The upward P1 load creates a reactive load (R1 in FIG. 7B) at the support fitting nut 34 to parachute support shaft 12 interface. The reactive load on the support fitting nut 34 to parachute support shaft 12 interface creates a tension load (labeled P2 in FIG. 7C) on the parachute support shaft 12, which then creates a compressive load on the rotor shaft, labeled R2. The compressive load R2 is the reaction to the tension load P2 and is a bearing load on the rotor shaft. As can be seen, the loads from the parachute 28 are thereby reacted in a distributed manner inside the rotor shaft 14, reducing concentrated loads and eliminating moment loads on the mast.

Figure 10:
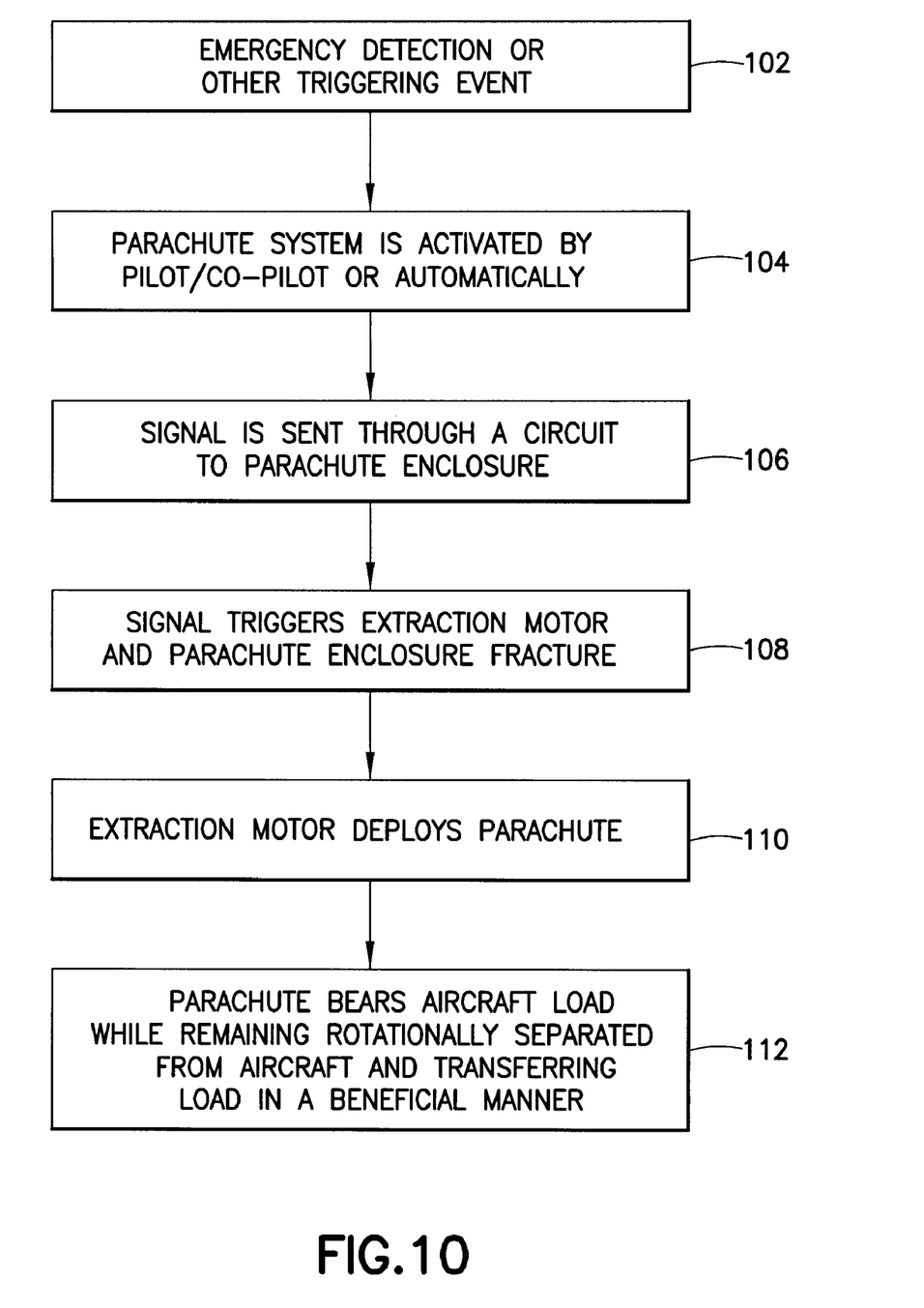
FIG. 10 is a flow chart depicting a method of operating a parachute support and stabilization system.

A method of operating the parachute support system is also provided. Referring to FIG. 10, the parachute system 10 is activated once an emergency is detected or in any other situation in which parachute deployment is desired. In step 102, upon detection of an emergency or other triggering event, a signal is sent to the pilot or other appropriate person within the helicopter. In step 104, such a person can then choose whether to activate the parachute system. Alternatively, the decision to activate the parachute system can be made automatically by a control device that monitors operation of the aircraft.

To activate the parachute system, a person such as a pilot will flip a switch in the cockpit which in step 106 will send an electrical signal through a circuit to an extraction motor and pyrotechnic device. In step 108, the pyrotechnic device fractures the upper portion of the parachute housing from the bottom portion. The extraction motor then lifts the upper portion of the parachute housing and the parachute up off of the bottom portion of the parachute housing. The top portion of the parachute housing protects the parachute from the exhaust gasses of the extraction motor. In step 110, once the parachute is far enough away from the rotor, it is deployed, at which point the entire weight of the helicopter may be borne by the parachute in step 112.

With the parachute deployed in this position, the bearing supports 16, 18 rotationally separate the parachute from the rest of the helicopter. As can be seen, the only load bearing points of contact between the parachute and the helicopter are at the bearing supports 16, 18.

This system can be added to existing and new rotorcraft with a minimum effect on performance and cost. Most aircraft rotor shafts are hollowed, and most which have improper interior contours can be machined to accommodate the parachute support shaft. For example, some rotor shafts would have to be machined to have bearing engagement flanges, or to have a general geometry that accommodates the parachute support shaft and support fitting.

Figure 11:
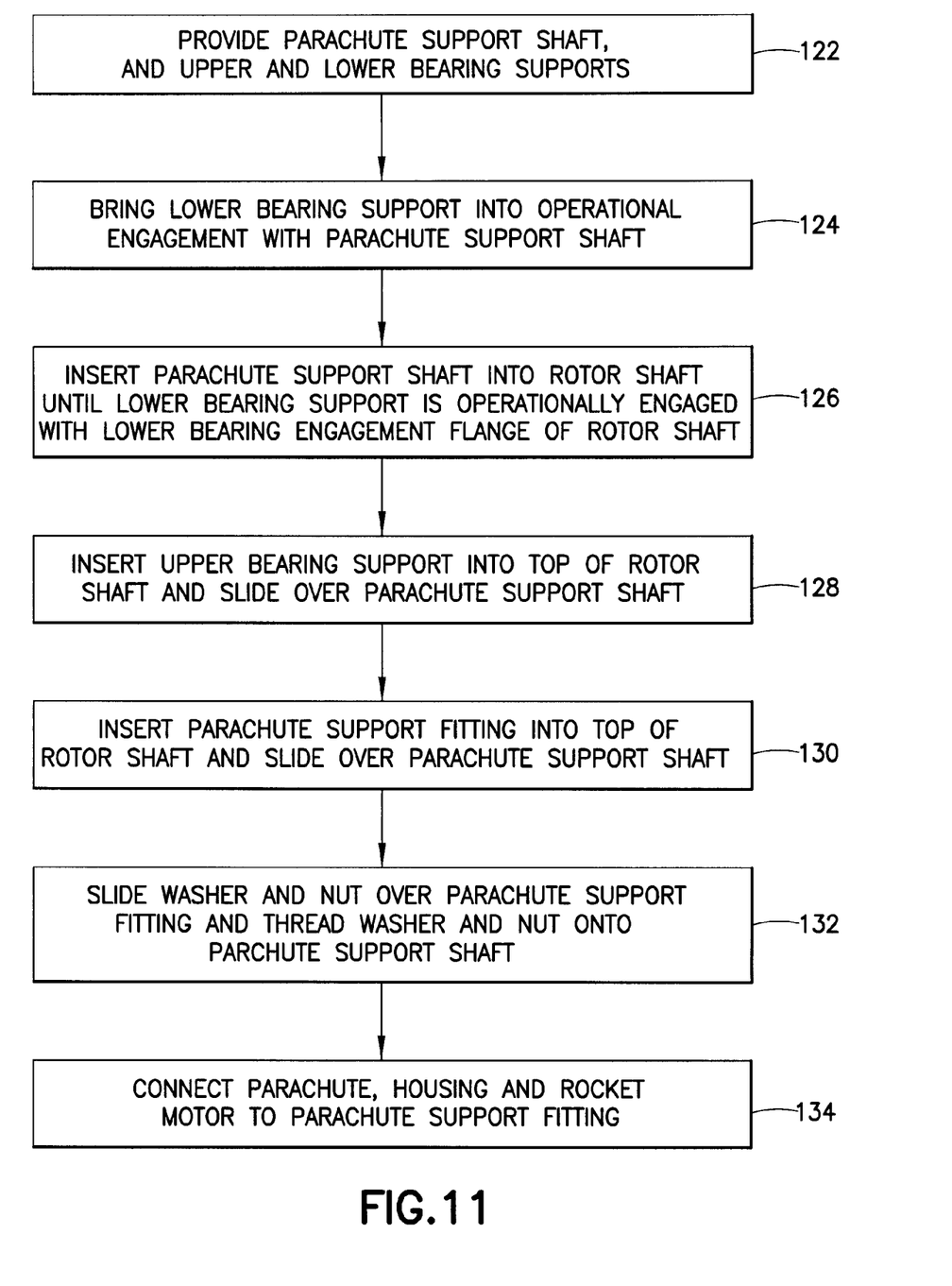
FIG. 11 is a flow chart depicting a method of installing a parachute support and stabilization system into a helicopter.

A method of installing a parachute support system 10 to a rotorcraft having a rotor shaft 14 is also provided in FIG. 11. In step 122, a parachute support shaft 12 is provided having a bottom portion 56, middle portion 54 and top portion 52. Upper and lower bearing supports 16, 18 are provided, each comprising inner and outer rotational members and bearings which allow the two rotational members to rotate with respect to each other. In step 124, the lower bearing supports 18 is brought into operational engagement with the bottom portion 56 of the parachute support shaft 12. In step 126, the parachute support shaft 12 and lower bearing support 18 are inserted into the rotor shaft 14. The rotor shaft 14 has upper and lower bearing engagement flanges 24, 26. The lower bearing supports 18 is brought into operational engagement with the lower bearing engagement flange 26. In step 128, the upper bearing support 16 is inserted into the top of the rotor shaft 14 and slid over the parachute support shaft 12. In step 130, the parachute support fitting 30 is inserted into the top of the rotor shaft 14 and slid over the parachute support shaft 12 and into engagement with the upper bearing support 16. In step 132, washer and nut 34 are slid over and threaded onto the parachute support shaft 12. At this point, the parachute support shaft 12 is engaged with but rotationally separated from the rotor shaft 14 of the rotorcraft, and is therefore rotationally separated from the rotorcraft. Finally, in step 132, cables 29 are attached to the parachute support fitting 30 and to a parachute 28 within a parachute housing 36, which is then engaged with the parachute support shaft 12 and which has all parts described above.

Many modifications and variations may of course be devised given the above description of the principles of the disclosure. It is intended that all such modifications and variations be considered as within the spirit and scope of this disclosure, as defined in the following claims.

The invention claimed is:

1. A parachute support and stabilization system comprising:
   a rotor shaft having a hollow interior, a neck portion and a bottom portion;
   a parachute support shaft having a top portion and a bottom portion, said parachute support shaft being disposed within the hollow interior of the rotor shaft;
   an upper bearing support having bearings, said upper bearing support being operationally engaged with the top portion of the parachute support shaft and with neck portion of the rotor shaft; and
   a lower bearing support having bearings, said lower bearing support being operationally engaged with the bottom portion of the parachute support shaft and with the bottom portion of the rotor shaft;
   said upper and lower bearing supports serving to distribute load from a parachute over the length of the rotor shaft.

2. The parachute support and stabilization system of claim 1, further comprising:
   a parachute housing coupled to a parachute support fitting at a top portion of the rotor shaft.

3. The parachute support and stabilization system of claim 2, further comprising:
   a rocket extraction motor attached to a top portion of the parachute housing.

4. The parachute support and stabilization system of claim 3, further comprising:
   a parachute within the parachute housing.

5. The parachute support and stabilization system of claim 4, further comprising:
   one or more cables connecting the rocket extraction motor to the parachute.

6. The parachute support and stabilization system of claim 4, further comprising:
one or more cables connecting the parachute to the rotor shaft.

7. The parachute support and stabilization system of claim 1, wherein the rotor shaft is a rotating shaft.

8. The parachute support and stabilization system of claim 1, wherein the rotor shaft is a non-rotating shaft.

9. The parachute support and stabilization system of claim 1, wherein:
the parachute support shaft has a top section, a middle section and a bottom section; and
the top section of the parachute support shaft has a smaller diameter than the bottom section of the parachute support shaft, and the middle section of the parachute support shaft has a diameter gradually increasing from the bottom section of the parachute support shaft to the top section of the parachute support shaft.

10. The parachute support and stabilization system of claim 1, further comprising:
a parachute support fitting disposed partially within the rotor shaft, and secured to the parachute support shaft with a support fitting nut.

11. The parachute support and stabilization system of claim 1, further comprising:
a cap fastened over the top end of the parachute support shaft; and
a seal sealing the cap.

12. The parachute support and stabilization system of claim 1, wherein:
said upper bearing support is operationally engaged with a top bearing engagement flange of said rotor shaft; and
said lower bearing support is operationally engaged with a bottom bearing engagement flange of said rotor shaft.

13. A helicopter comprising:
a helicopter body;
a rotor shaft coupled to the helicopter body, said rotor shaft having a hollow interior, a narrow neck portion and a bottom portion;
a parachute support shaft having a top end and a bottom end, said parachute support shaft being disposed within the hollow interior of the main helicopter rotor shaft;
an upper bearing support having bearings, said upper bearing support being operationally engaged with the top portion of the parachute support shaft and with the narrow neck portion of the rotor shaft; and
a lower bearing support having bearings, said lower bearing support being operationally engaged with the bottom portion of the parachute support shaft and with the bottom portion of the rotor shaft;
said upper and lower bearing supports serving to distribute load from a parachute over the length of the rotor shaft.

14. The helicopter of claim 12, wherein:
said helicopter is a single rotor helicopter.

15. The helicopter of claim 12, wherein:
said helicopter is a tandem rotor helicopter.

16. The helicopter of claim 12, wherein:
said main helicopter rotor shaft is non-rotating.

17. The helicopter of claim 12, wherein:
said main helicopter rotor shaft is rotating.

18. A method of fitting a helicopter, having at least one rotor shaft, with a parachute support and stabilization system, comprising:
providing a parachute support shaft having a top portion and a bottom portion;
inserting the parachute support shaft into a hollow interior of the rotor shaft;
operationally engaging a lower bearing support having bearings to the bottom portion of the parachute support shaft and to a bottom portion of the rotor shaft, and an upper bearing support having bearings to the top portion of the parachute support shaft and to the narrow neck portion of the rotor shaft, such that said upper and lower bearing supports serve to distribute load from a parachute over the length of the rotor shaft.

19. A method of fitting a helicopter with a parachute support and stabilization system as in claim 18, further comprising:
machining the rotor shaft such that it has an internal geometry which can accommodate the parachute support shaft.

20. A method of fitting a helicopter with a parachute support and stabilization system as in claim 18, further comprising:
machining the rotor shaft to form a top support flange and a bottom support flange.

21. A method of fitting a helicopter with a parachute support and stabilization system as in claim 18, further comprising:
coupling a parachute housing having a parachute to the parachute support shaft.

* * * * *